(12) United States Patent
Okano (10) Patent No.: US 9,013,280 B2
(45) Date of Patent: Apr. 21, 2015

(54) AIR CONDITIONER

(75) Inventor: Takashi Okano, Sakai (JP)

(73) Assignee: Daikin Industries Ltd., Osaka (JP)

( * ) Notice: Subject to any disclaimer, the term of this patent is extended or adjusted under 35 U.S.C. 154(b) by 512 days.

(21) Appl. No.: 13/575,318

(22) PCT Filed: Jan. 14, 2011

(86) PCT No.: PCT/JP2011/050507
§ 371 (c)(1),
(2), (4) Date: Jul. 26, 2012

(87) PCT Pub. No.: WO2011/122061
PCT Pub. Date: Oct. 6, 2011

(65) Prior Publication Data
US 2012/0298764 A1    Nov. 29, 2012

(30) Foreign Application Priority Data

Mar. 29, 2010  (JP) ................................. 2010-075850

(51) Int. Cl.
*G05B 11/01*    (2006.01)
*F24F 11/00*    (2006.01)
*H04L 25/02*    (2006.01)

(52) U.S. Cl.
CPC ..... *F24F 11/0009* (2013.01); *F24F 2011/0068* (2013.01); *H04L 25/0272* (2013.01)

(58) Field of Classification Search
CPC ................................. G08C 19/28; G06F 1/022
USPC ...................... 340/12.22, 12.31, 855.2, 855.4
See application file for complete search history.

(56) References Cited

U.S. PATENT DOCUMENTS 5,589,813 A * 12/1996 Nielsen .......................... 375/257
7,748,225 B2 * 7/2010 Butler et al. .................... 62/181

FOREIGN PATENT DOCUMENTS

JP           7-280328 A       10/1995

* cited by examiner

*Primary Examiner* — Vernal Brown
(74) *Attorney, Agent, or Firm* — Birch, Stewart, Kolasch & Birch, LLP (57) ABSTRACT

Provided is an air conditioner that suppresses power consumption by discharging resistors for discharging residual charges of a transmission path. An analog switch is previously interposed between two discharging resistors. In sending an AMI signal to two lines of a transmission path, an MCU executes discharge control to cause the analog switch to achieve an OFF state when a high level signal voltage is output, and to cause the analog switch to achieve an ON state when a low level signal voltage is output.

8 Claims, 13 Drawing Sheets

AIR CONDITIONER

TECHNICAL FIELD

The present invention relates to an air conditioner. In particular, the present invention relates to signal transmission between devices structuring the air conditioner.

BACKGROUND ART

Figure 12:
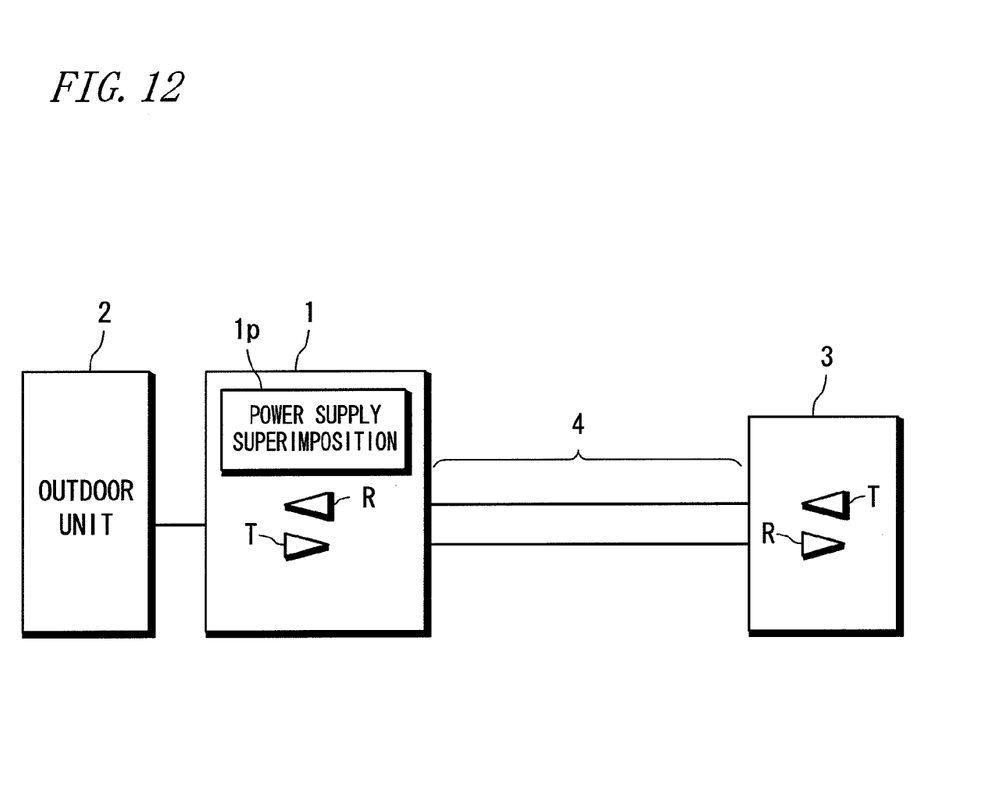
FIG. 12 is a diagram showing the overview of signal transmission in the air conditioner.

FIG. 12 is a diagram showing the overview of signal transmission in an air conditioner. In the figure, an indoor unit 1 performs signal transmission between an outdoor unit 2 and a remote controller 3. The indoor unit 1 and the remote controller 3 are connected to each other normally with a transmission path 4 that includes two lines (e.g., a double core cable). The indoor unit 1 and the remote controller 3 each include a transmission unit T and a reception unit R, so that they can perform transmission and reception between each other. The power supply for the remote controller 3 is supplied from a power superimposition circuit 1p provided at the indoor unit 1 via the transmission path 4.

Figure 13:
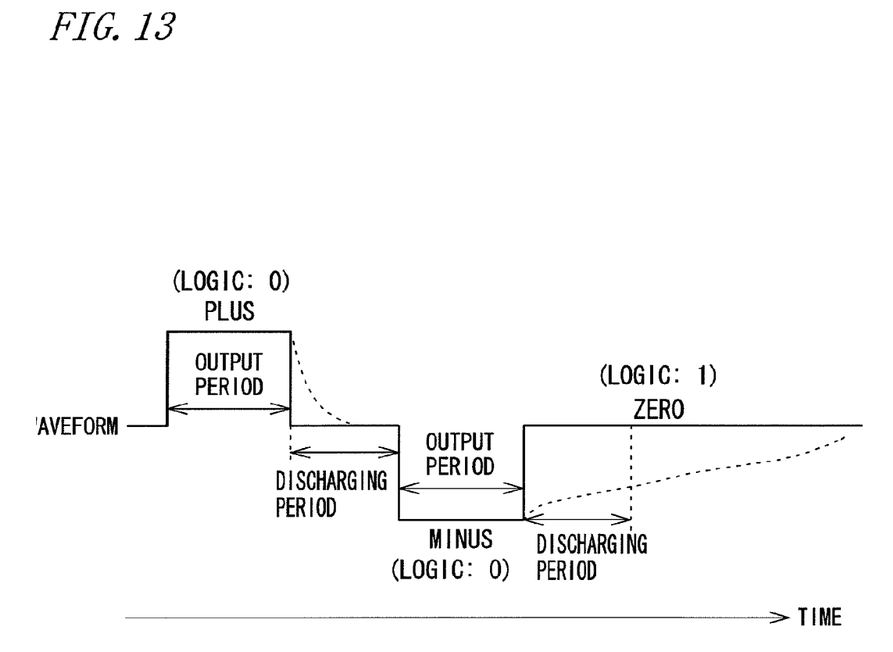
FIG. 13 is a diagram showing one example of a signal waveform according to AMI scheme.

FIG. 13 shows one example of a signal waveform according to AMI (Alternate Mark Inversion) scheme used for signal transmission. AMI scheme is one of the schemes that transmit digital signals through half-duplex communication, in which a signal is transmitted by setting the signal voltage without DC components between the two lines of the transmission path to one of zero, plus, and minus. For example, in the case of negative logic, logic 1 is allotted to zero, and logic 0 is alternately allotted to the level of plus or minus. Further, every time a 1-bit signal is transmitted, a period is provided for discharging charges accumulated in a floating capacitance (stray capacitance) that is present between the two lines of the transmission path.

After the signal waveform of plus or minus is output, it is necessary to return the signal voltage to zero in preparation for the next signal waveform. For example, there is no problem when the signal voltage returns to zero within the discharging period as represented by the dotted line following the plus waveform shown in FIG. 13. However, actually, when the charges accumulated in the floating capacitance by the signal voltage attributed to the output of the plus or minus signal waveform are naturally discharged, as represented by the dotted line following the minus waveform in FIG. 13, it takes time until the signal voltage returns to zero. In this case, when the logic to be transmitted at the next clock timing is "1", the transmission side does not output any plus or minus signal voltage (zero output). Therefore, the minus voltage attributed to the residual charges is sensed on the reception side, which may incorrectly be recognized as logic "0".

Accordingly, there is provided a circuit that forcibly discharges the residual charges, which inhibit signal transmission, through use of discharging resistors connected between the two lines of the transmission path (e.g., see Patent Literature 1). Such discharging resistors can be provided in the indoor unit or in the remote controller.

CITATION LIST

Patent Literature

Patent Literature 1: Japanese Unexamined Patent Publication No. 7-280328 (FIG. 10)

SUMMARY OF INVENTION

Technical Problem

However, with the conventional air conditioner as described above, every time a signal is sent to the transmission path, current flows through the discharging resistors and consumes the power. This is the power consumption which is not related to the original purpose of discharge. By this amount, the required power supply capacity increases. Further, it is not preferable that the voltage (transmission voltage) is slightly reduced by current flowing through the discharging resistor. Still further, in the case where the discharging resistors are in the remote controller, the heat dissipation from the discharging resistors increases the temperature inside the housing of the remote controller. This causes the room temperature sensor provided in the remote controller to fail to accurately detect the room temperature.

In view of the above conventional problems, there is provided an air conditioner that suppresses power consumption by discharging resistors for discharging residual charges of a transmission path.

Solution to Problem (1) The invention provides an air conditioner having devices being an outdoor unit, an indoor unit, and a remote controller, the air conditioner performing signal transmission using a digital signal between the devices connected to each other through a transmission path including two lines, including: a discharging resistor for discharging charges accumulated in a floating capacitance between the two lines; a switching element that performs an ON operation to make the discharging resistor connect between the two lines and an OFF operation to make the discharging resistor disconnect; a control unit that executes discharge control, during signal transmission in which one of a high level and a low level of an absolute value corresponding to a sign of the digital signal is set to a signal voltage between the two lines, to set the switching element to an OFF state when the setting is at the high level and to set the switching element to an ON state when the setting is at the low level.

With the air conditioner structured as described above, by the control unit executing the discharge control, the discharging resistor is connected to the transmission path when the signal voltage set between the two lines is at the low level, and the discharging resistor will not be connected to the transmission path when the signal voltage set between the two lines is at the high level. Accordingly, it becomes possible to prevent the current from flowing through the discharging resistor by the signal voltage of the digital signal.

(2) Further, in the air conditioner according to (1), the discharging resistor may include a first discharging resistor having one end connected to one of the two lines and a second discharging resistor having one end connected to the other of the two lines, and the switching element may be a bidirectional element being interposed between the other end of the first discharging resistor and the other end of the second discharging resistor.

With such a circuit configuration, since the discharging circuit is structured such that the bidirectional switching element is interposed between the first and second discharging resistors, it is possible to discharge the accumulating charges by inverting the polarity, in the case where the digital signal is coded according to AMI scheme. Further, at whichever one of the two lines the surge is induced, the voltage drop always occurs via the resistors, and the surge voltage will not directly be applied to the switching element. Accordingly, the switching element can be protected from the surge. Further, thanks to the presence of the two discharging resistors, the output terminal of the switching element is at the intermediate voltage of the power supply voltage. Accordingly, the potential difference (gate-source voltage) with reference to the control terminal can easily be secured.

(3) Further, in the air conditioner according to (2), cathodes of Zener diodes may be respectively connected to the two lines, and the switching element may be structured with a CMOS circuit, a current value of latch up withstand of the CMOS circuit being selected such that a potential difference being applied in respective positive and negative directions to a power supply voltage Vcc and GND of the CMOS circuit becomes greater than clamping voltages $Vc^+$ and $Vc^-$ of the Zener diode in the respective positive and negative directions, the potential difference being attributed to the current value flowing through the discharging resistors.

In this case, when the current value of latch up withstand flows through the CMOS circuit, the current value is already greater than the clamping voltage $Vc^+$ or $Vc^-$ of the Zener diodes. Therefore, in other words, before the current increases to reach the current value of latch up withstand, the voltage of each line is suppressed to the clamping voltage by each Zener diode. Accordingly, it becomes possible to surely allow the Zener diodes to operate against a high surge voltage, and to prevent the occurrence of the latch-up phenomenon of the CMOS circuit.

(4) Further, in the air conditioner according to (1), the control unit may execute the discharge control by a digital signal to be transmitted.

In this case, it is not necessary to separately prepare a signal for the discharge control. Accordingly, without the necessity of drastically changing the existing design of the air conditioner, the function of the discharge control can easily be realized by using the originally existing signal.

(5) Further, in the air conditioner according to any of (1) to (4), the discharging resistor(s), the switching element, and the control unit may be provided in the remote controller.

In this case, although the discharging resistor(s) is/are accommodated in the compact housing of the remote controller, suppression of the current flowing through the discharging resistor(s) also suppresses the heat generation amount of the discharging resistor(s) and the heat generation amount of the power supply circuit. Accordingly, in the case where a room temperature sensor is provided at the remote controller, the influence to the measurement can be reduced.

Advantageous Effects of Invention

With the air conditioner of the present invention, it becomes possible to prevent current from flowing through the discharging resistor by the signal voltage, and power consumption can be suppressed by the saved amount.

DESCRIPTION OF EMBODIMENTS

First Embodiment

In the following, with reference to the drawings, a description will be given of an air conditioner according to a first embodiment of the present invention. As has already been shown in FIG. 12, the whole air conditioner is structured with an indoor unit 1, an outdoor unit 2, and a remote controller 3, which are performing signal transmission between each other. Further, the indoor unit 1 and the outdoor unit 2 are connected to each other through not-shown coolant piping. It is to be noted that FIG. 12 shows the basic form, and the number of each of the devices, i.e., the indoor unit 1, the outdoor unit 2, and the remote controller 3, may be plural, when necessary. However, in connection with the relationship between the indoor unit 1 and the remote controller 3, the description will be given of the case in which one remote controller 3 is connected to one indoor unit 1, in the present embodiment.

Figure 1:
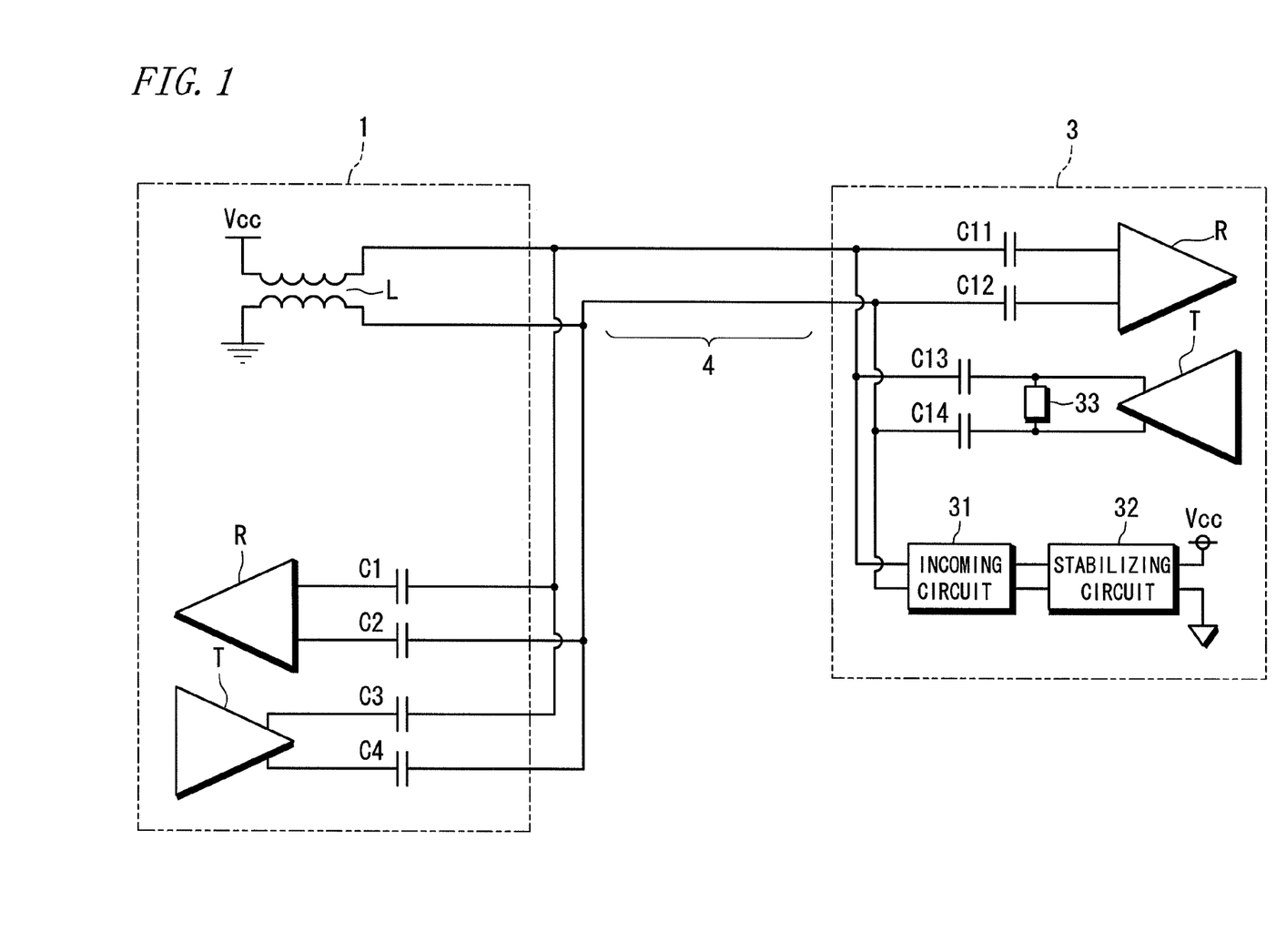
FIG. 1 is a circuit diagram showing the state where, in connection with signal transmission, an indoor unit and a remote controller are connected to each other through a transmission path.

FIG. 1 is a circuit diagram showing the state where, in connection with signal transmission, the indoor unit 1 and the remote controller 3 are connected to each other through a transmission path 4 including two lines (e.g., a cable). In the figure, the indoor unit 1 is provided with: a choke coil L for superimposing a power supply voltage Vcc (16 V herein) on the transmission path 4; a transmission unit T that transmits a digital signal (hereinafter referred to as an AMI signal) to the remote controller 3 according to AMI coding scheme; a reception unit R that receives an AMI signal from the remote controller 3; and capacitors C1 to C4 that allow only transmission- and reception-purpose signals to pass. Those components are connected as shown in the figure.

The power supply voltage Vcc is supplied to the remote controller 3 from the choke coil L through the transmission path 4. At the remote controller 3, through an incoming circuit 31 including a choke coil, a rectifier smoothing circuit, and the like, and a stabilizing circuit 32 structured with a three-terminal regulator, a power supply voltage Vcc (5 V herein) is generated. It is to be noted that, with the incoming circuit 31 and the stabilizing circuit 32, the power supply circuit of the remote controller 3 is structured. The power supply voltage Vcc is supplied to all the electronic devices within the remote controller 3 that require power supply.

What are provided in the remote controller 3 are: a transmission unit T that transmits an AMI signal to the indoor unit 1; a reception unit R that receives an AMI signal from the indoor unit 1; capacitors C11 to C14 that allow only transmission- and reception-purpose signals to pass; and a discharging circuit 33 (which will be detailed later). Those components are connected as shown in the figure. In the present example, the discharging circuit 33 is provided only in association with the transmission unit T of the remote controller 3.

Figure 2:
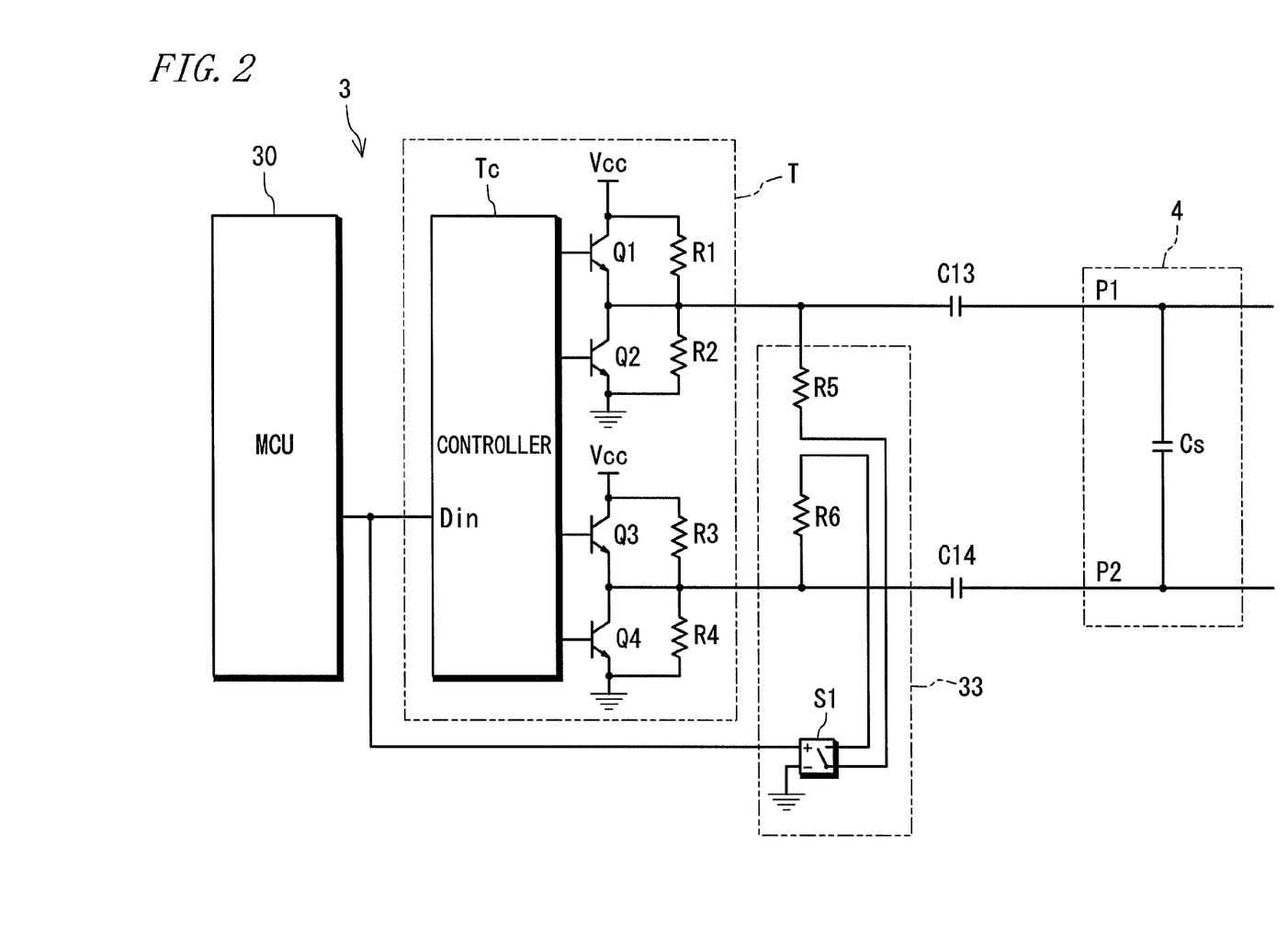
FIG. 2 is a circuit diagram showing the detail of a transmission unit and others in the remote controller, and a floating capacitance between two lines in the transmission path.

FIG. 2 is a circuit diagram showing the detail of the transmission unit T and others in the remote controller 3, and a floating capacitance Cs between two lines in the transmission path 4 (it is to be noted that, the right-left relationship is inverted from FIG. 1). In the figure, the MCU (Micro Control Unit) 30 instructs the transmission unit T what binary signal is to be transmitted. The transmission unit T has: four transistors Q1 to Q4; resistors R1 to R4 (whose resistance values are basically equivalent) that are connected in parallel between the collectors and emitters of the transistors Q1 to Q4; and a controller Tc that turns the transistors Q1 to Q4 ON and OFF. The transmission unit T operates to output an AMI signal of plus/minus/zero in accordance with the binary signal instructed by the MCU 30. It is to be noted that, the MCU 30 controls not only the transmission unit T but also the reception unit R (FIG. 1).

The discharging circuit 33 is structured with two discharging resistors R5 and R6 whose resistance values are equivalent, and an analog switch S1 as a switching element. One end of the discharging resistor R5 is connected to one line P1 of the transmission path 4 via the capacitor C13. Similarly, one end of the discharging resistor R6 is connected to the other line P2 of the transmission path 4 via the capacitor C14. Further, the analog switch S1 is interposed between the other ends of respective discharging resistors R5 and R6, whereby the two discharging resistors R5 and R6 and the analog switch S1 are connected to one another in series. The discharging resistors R5 and R6 provide the resistance value suitable for discharging by the total of two resistance values. The analog switch S1 is structured with a CMOS circuit (MOS-FET), and is a bidirectional element.

The terminals of the analog switch S1 between the two discharging resistors R5 and R6 are [source]-[drain] Further, to the gate thereof, a binary signal output from the MCU 30 (hereinafter also referred to as an MCU output signal), that is, a transmitted signal, is provided. The analog switch S1 is connected to GND, and is supplied with power supply voltage Vcc.

Between the two lines P1 and P2 of the transmission path 4, the power supply voltage Vcc (16 V) of the indoor unit 1 (FIG. 1) is constantly applied. The signal transmission is performed by setting high and low levels of the absolute values corresponding to the sign of the AMI signal to the signal voltage between the two lines P1 and P2 of the transmission path 4, based on 16 V. That is, the potential, potential difference, signal voltage of P1 and P2 corresponding to the sign of the AMI signal, and the setting level of the signal transmission based on the absolute value irrespective of plus or minus are represented as in Table 1, for example. Further, the discharging period corresponds to the state being identical to sign zero.

TABLE 1

| Sign | P1 Potential [V] | P2 Potential [V] | Potential difference [V] | Signal voltage [V] | Level |
|---|---|---|---|---|---|
| Plus | 18.5 | −2.5 | 21 | +5 | High |
| Zero | 16 | 0 | 16 | 0 | Low |
| Minus | 13.5 | 2.5 | 11 | −5 | High |

Figure 3:
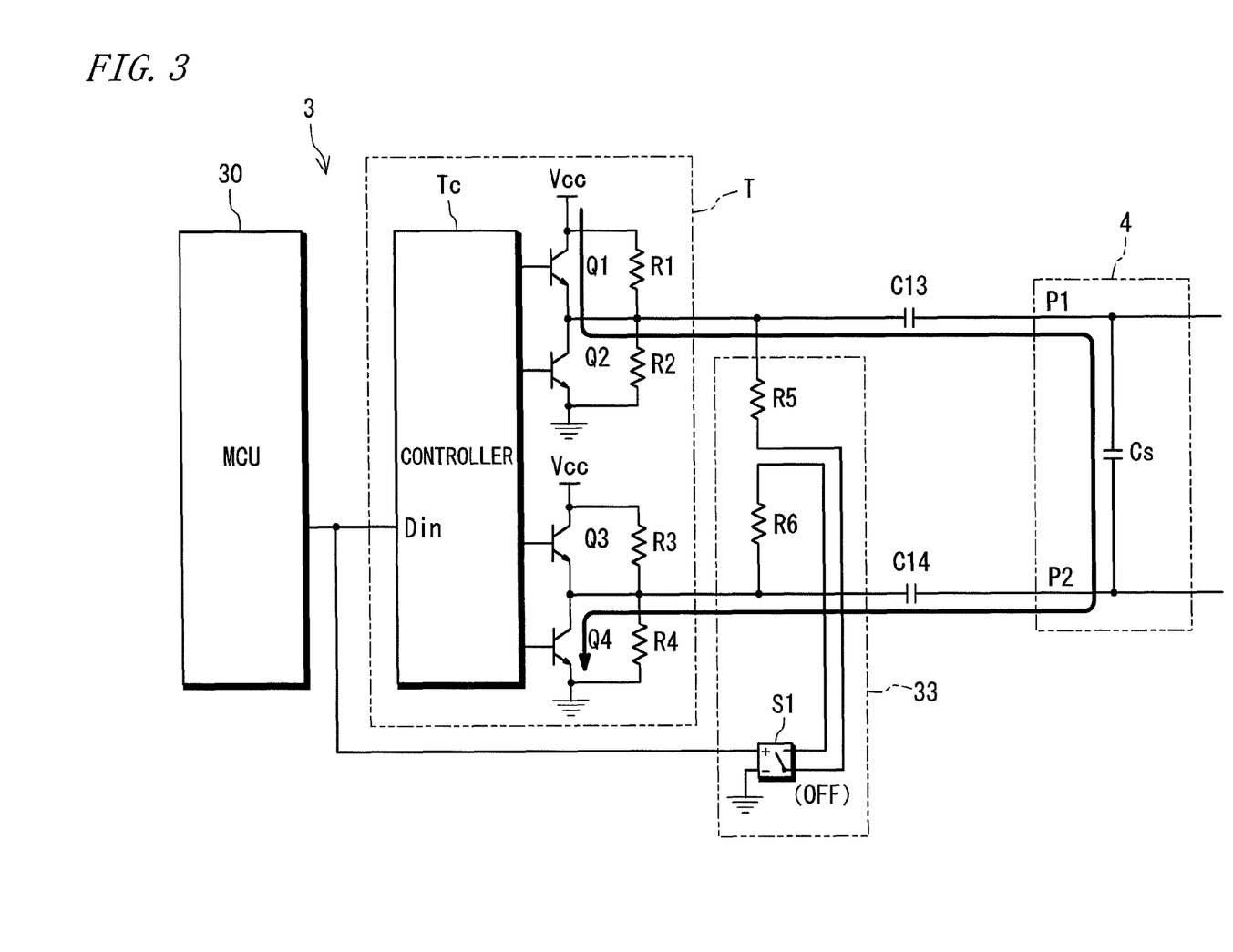
FIG. 3 is a diagram in which the flow of current is overlaid on FIG. 2, showing the state where an MCU output signal is logic 0, an AMI signal is plus, and the line P1 side becomes, for example, plus.
Figure 4:
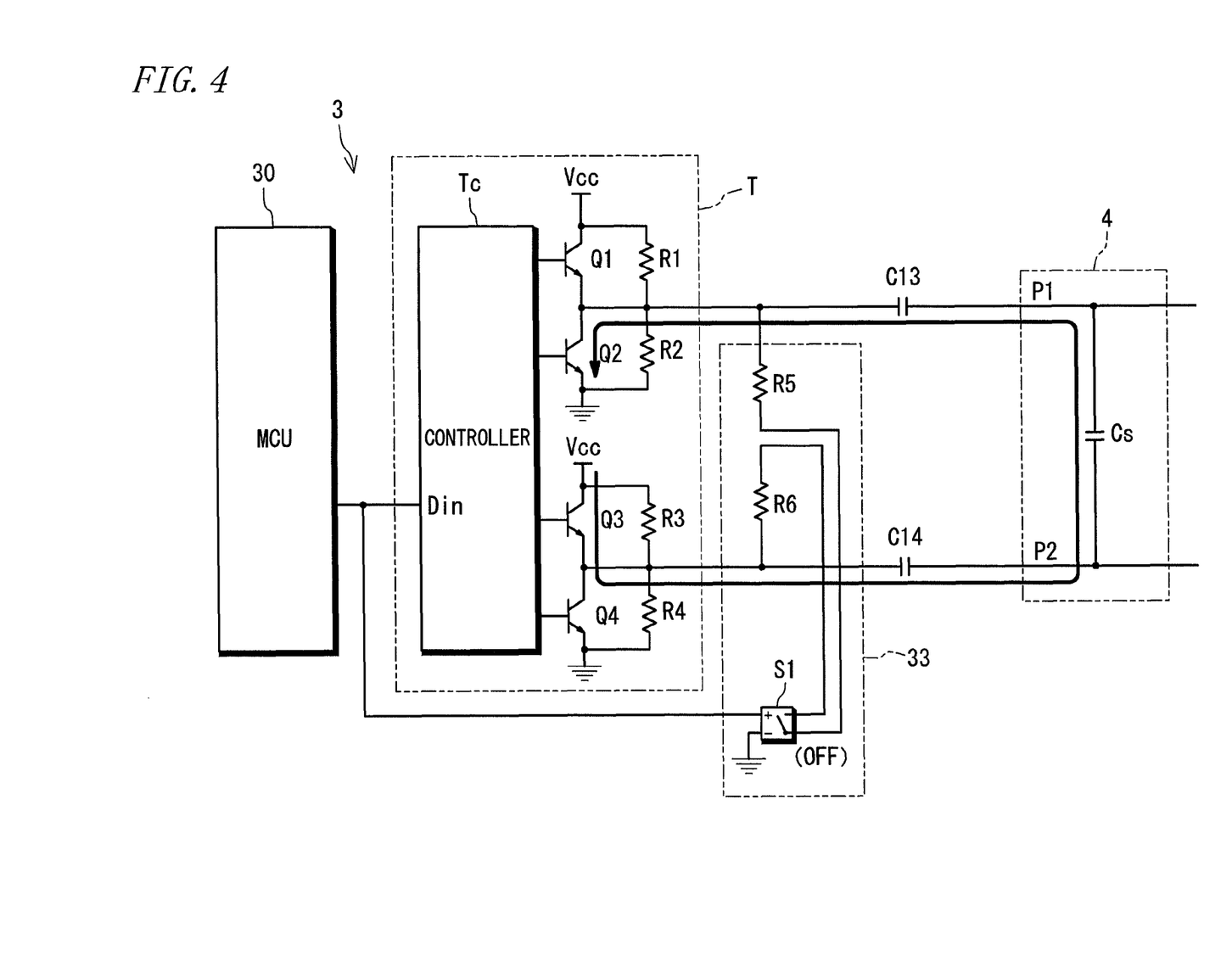
FIG. 4 is a diagram in which the flow of current is overlaid on FIG. 2, showing the state where an MCU output signal is logic 0, an AMI signal is minus, and the line P2 side becomes, for example, plus.
Figure 5:
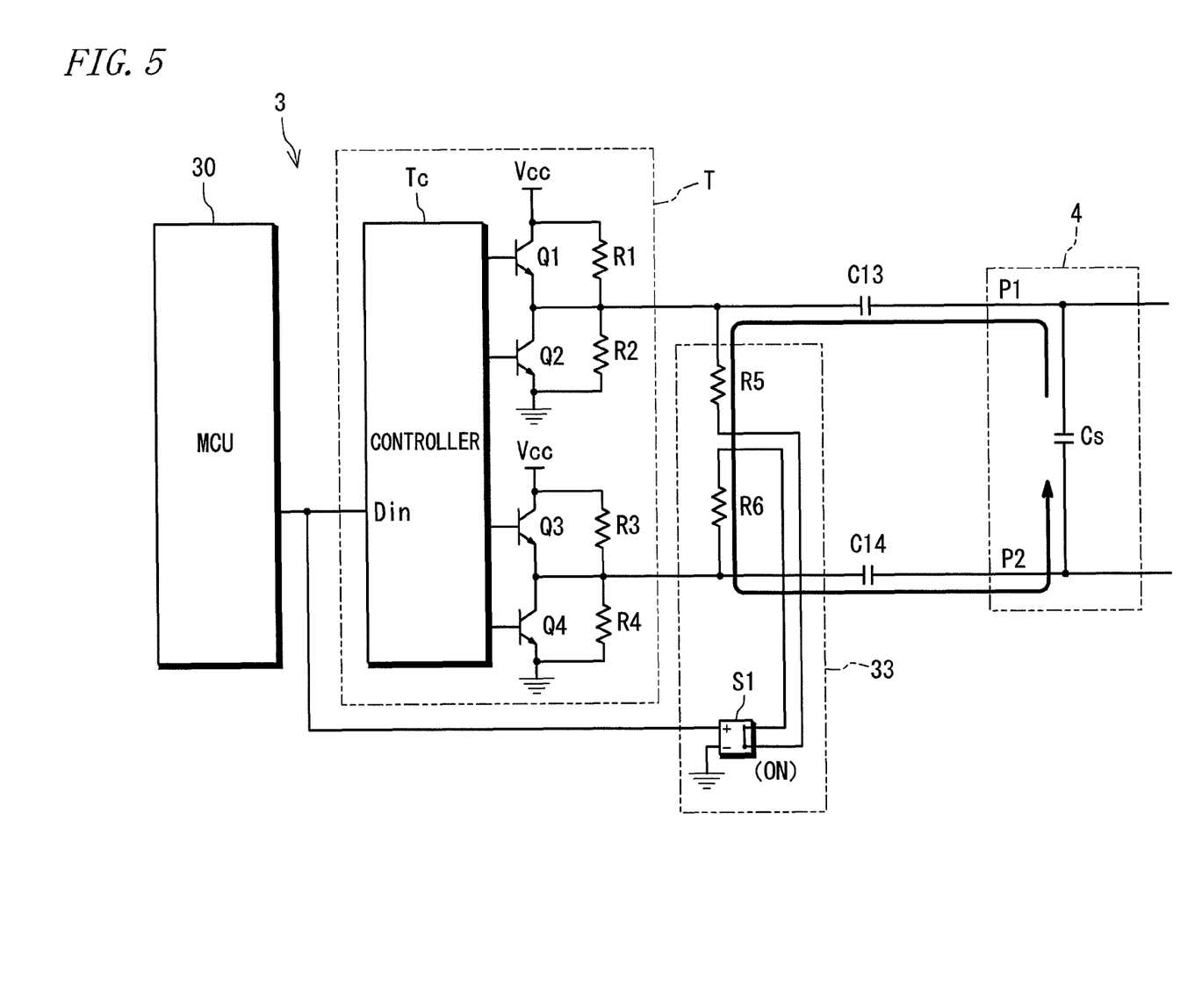
FIG. 5 is a diagram in which the flow of current is overlaid on FIG. 2, showing the state where an MCU output signal is logic 1 and an AMI signal is zero.

Further, a description will be given of the operation of the discharging circuit 33. FIGS. 3 to 5 are each a diagram in which the flow of current is overlaid on FIG. 2. FIG. 3 shows the state where an MCU output signal is logic 0, an AMI signal is plus and the line P1 side becomes, for example, plus. In order to achieve this state, the controller Tc turns the transistors Q1 and Q4 ON and turns Q2 and Q3 OFF. At this time, current flows from the power supply voltage Vcc to GND via the transistor Q1, the capacitor C13, the floating capacitance Cs, the capacitor C14, and the transistor Q4. Accordingly, the transmission path 4 enters the state of plus output shown in Table 1 in which P1 outputs signal voltage +5 V to P2. On the other hand, the analog switch S1 is in the OFF state because the MCU output signal is 0. Accordingly, no current flows through the discharging resistors R5 and R6.

FIG. 4 shows the state where the MCU output signal is logic 0, the AMI signal is minus, and the line P2 side becomes, for example, plus. In order to achieve this state, the controller Tc turns the transistors Q2 and Q3 ON, and turns Q1 and Q4 OFF. At this time, current flows from the power supply voltage Vcc to GND via the transistor Q3, the capacitor C14, the floating capacitance Cs, the capacitor C13, and the transistor Q2. Accordingly, contrary to FIG. 3, the transmission path 4 enters the state of minus output shown in Table 1 in which P2 outputs signal voltage −5 V to P1. On the other hand, the analog switch S1 is in the OFF state because the MCU output signal is 0. Accordingly, no current flows through the discharging resistors R5 and R6.

FIG. 5 shows the state where the MCU output signal is logic 1 and the AMI signal is zero. In order to achieve this state, the controller Tc turns all the transistors Q1 to Q4 OFF. On the other hand, since the MCU output signal is logic 1, the analog switch S1 enters the ON state. When the floating capacitance Cs has no charges (i.e., the charges attributed to the signal voltage, and not the charges attributed to 16 V. Hereinafter the same holds true.), the potential of P1 and the potential of P2 attributed to the power supply voltage Vcc become Vcc·R2/(R1+R2) and Vcc·R4/(R3+R4), respectively, and are equivalent since the division ratio is identical. In this state, the signal voltage is 0, and the zero output state in Table 1 is achieved.

It is to be noted that, since the capacitors C13 and C14 cut off the DC components, constant current will not flow through the discharging resistors R5 and R6 by the DC voltage (16 V) supplied from the indoor unit 1 side to the transmission path 4.

On the other hand, when the charges following the plus output are accumulated in the floating capacitance Cs, the charges flow through the capacitor C13, the discharging resistor R5, the analog switch S1, the discharging resistor R6, and the capacitor C14, and are discharged. Conversely, when the charges following the minus output are accumulated in the floating capacitance Cs, the charges flow through the capacitor C14, the discharging resistor R6, the analog switch S1, the discharging resistor R5, and the capacitor C13 (opposite to the direction shown in the figure), and are discharged. It is to be noted that the resistance value of the discharging resistors R5 and R6 is selected such that discharge ends in a short time period within a clock cycle. After discharge is completed, the state where the signal voltage between the two lines of the transmission path 4 is 0 is achieved.

Figure 6:
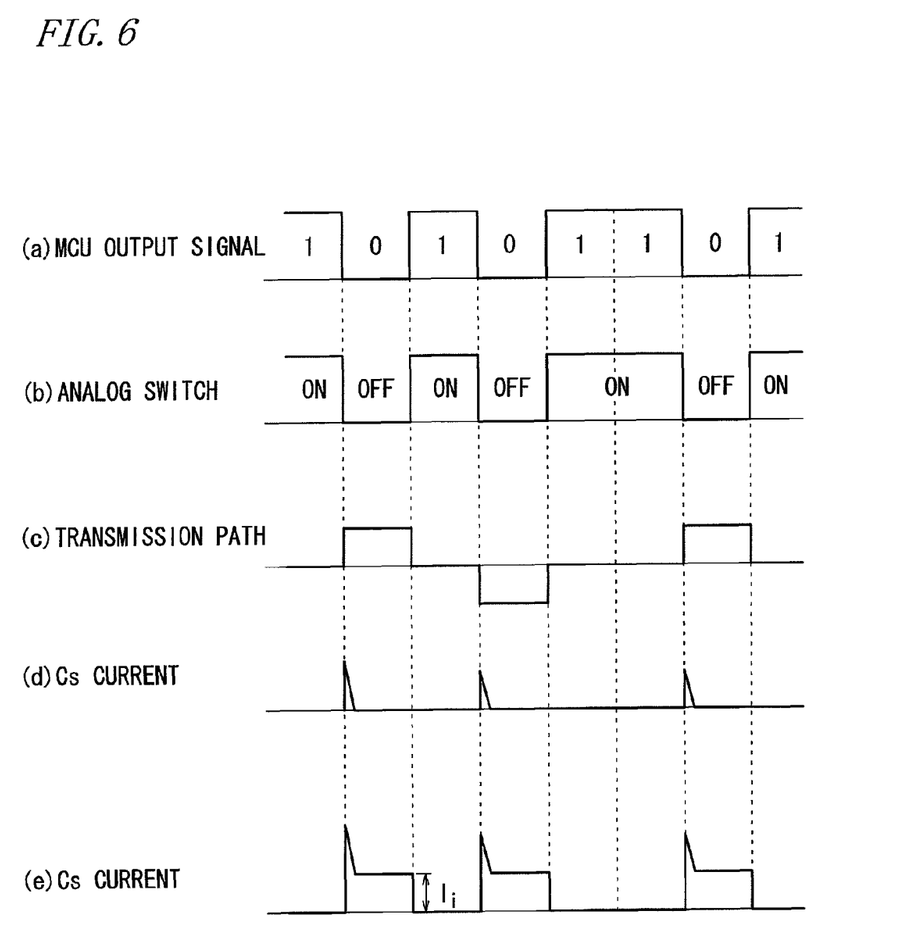
FIG. 6 is a waveform diagram of each of: (a) an MCU output signal; (b) ON/OFF state of an analog switch S1; (c) a signal transmitted to a transmission path; and (d) a current that flows from the power supply voltage to the floating capacitance upon signal transmission, all of which are based on the circuit configuration shown in FIG. 2; and (e) current that flows from the power supply voltage to the floating capacitance as in the conventional case where the discharging resistors are constantly connected to the transmission path, shown for the purpose of comparison.

FIG. 6 is one example of a waveform diagram showing each of: (a) an MCU output signal; (b) ON/OFF state of the analog switch S1; (c) a signal transmitted to a transmission path; and (d) a current that flows from the power supply voltage Vcc to the floating capacitance Cs upon signal transmission, all of which are based on the circuit configuration shown in FIG. 2. Further, (e) is one example of a waveform diagram showing current flowing through the floating capacitance Cs attributed to the power supply voltage Vcc as in the conventional case where the discharging resistors are constantly connected to the transmission path 4, shown for the purpose of comparison.

In FIG. 6, sign 0/1 of the MCU output signal and OFF/ON state of the analog switch S1 are synchronized with each other. According to AMI coding, a signal on the transmission path 4 inverts plus/minus every time the MCU output signal assumes 0. When the MCU output is 1, the signal is zero. Further, when a plus or minus signal voltage is output to the transmission path 4, the analog switch S1 is turned OFF, and no current flows through the discharging resistors R5 and R6.

At the moment when the signal voltage occurs at the transmission path 4, the charging current shown in (d) flows through the floating capacitance Cs. However, when charging is completed, the flow stops. Accordingly, the current flows only transiently, and the power consumption by the discharging resistors R5 and R6 is very small. In contrast, conventionally, as shown in (e), in addition to the transient charging current, constant current $I_t$ flows through the discharging resistors by the signal voltage of the transmission path. Therefore, the power consumption is great, resulting in a great difference from (d).

As has been described above, with the air conditioner according to the present embodiment, during the signal transmission based on the setting of the high/low level of the absolute value corresponding to the sign of an AMI signal to the signal voltage between the two lines P1 and P2, the MCU 30 being the control unit executes discharge control to turn the analog switch S1 into the OFF state when the setting is at the high level and to turn the analog switch S1 into the ON state when the setting is at the low level. Under such discharge control, the discharging resistors R5 and R6 are connected to the transmission path 4 when the signal voltage set by the AMI signal between the two lines P1 and P2 is at the low level, and the discharging resistors R5 and R6 are not connected to the transmission path 4 when the signal voltage set by the AMI signal between the two lines P1 and P2 is at the high level. Accordingly, it becomes possible to prevent current from flowing through the discharging resistors R5 and R6 by the signal voltage of the AMI signal, and power consumption can be suppressed by the saved amount.

Further, according to the circuit configuration described above, there is provided the discharging circuit 33 in which the bidirectional analog switch S1 is interposed between the two discharging resistors R5 and R6. Thus, the accumulating charges can be discharged by inverting the polarity as to the AMI signal.

Further, the source of the analog switch S1 is at the intermediate voltage of the power supply voltage Vcc, thanks to the presence of the two discharging resistors R5 and R6. Accordingly, the potential difference (the gate-source voltage) with reference to the gate can easily be secured. When the gate-source voltage is fully secured, the ON resistance becomes small. Accordingly, heat generation is small and excellent efficiency can be achieved.

For example, similar discharge control can be realized by replacing R5 and R6 in the discharging circuit 33 by one resistor R7 (not shown) having the resistance value equivalent to the total resistance value of R5 and R6, and connecting the analog switch S1 to the resistor R7 in series. However, in this case, since the source voltage of the analog switch S1 approaches Vcc, the gate-source voltage cannot be fully secured even if the gate signal is provided with the voltage Vcc. In this state, the ON resistance becomes great and heat generation becomes great.

On the other hand, since the MCU 30 executes discharge control by the digital signal to be transmitted, it is not necessary to separately prepare a signal for discharge control. Therefore, without drastically changing the design of the existing air conditioner, the function of discharge control can easily be realized using the originally existing signal.

Further, although the discharging resistors R5 and R6 are accommodated in the compact housing of the remote controller 3, the suppression of current suppresses the heat generation amount of the discharging resistors and the heat generation amount of the power supply circuit as well. Accordingly, in the case where a room temperature sensor is provided to the remote controller 3, the influence to the measurement can be reduced.

It is to be noted that the transmission path 4 is often arranged along the power line. In such a situation, surge may be induced at the two lines P1 and P2 of the transmission path 4 from the power line. The analog switch S1 is structured with the CMOS circuit, and generally susceptible to the surge. However, since the resistors R5 and R6 are provided at both the sides of the analog switch S1, respectively, the surge voltage will not directly be applied to the analog switch S1. That is, even when the surge is induced at one of the two lines, the voltage drop attributed to the resistors R5 and R6 always occurs, to alleviate the surge voltage. Accordingly, the analog switch S1 can be protected from the surge.

Figure 7:
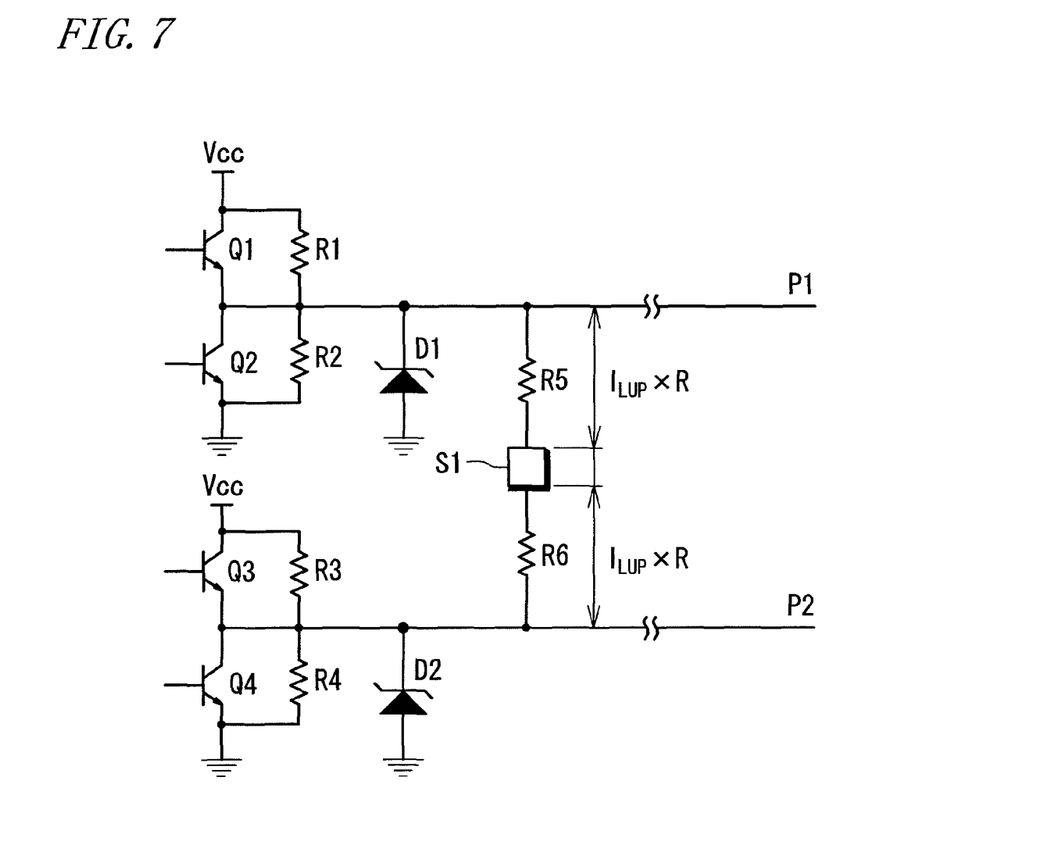
FIG. 7 is a circuit diagram showing the connection of Zener diodes.

FIG. 7 is a circuit diagram showing the Zener diodes D1 and D2 not shown in FIG. 2 (not shown in FIGS. 3 to 5 as well). That is, to the interconnection point (the emitter of Q1 and the collector of Q2) of the transistors Q1 and Q2 and the interconnection point (the emitter of Q3 and the collector of Q4) of the transistors Q3 and Q4, the cathodes of the Zener diodes D1 and D2 are connected, respectively. Thus, even when the voltage greater than the clamping voltage of the Zener diodes D1 and D2 is applied to the two lines P1 and P2 of the transmission path 4, the voltage is suppressed to the clamping voltage.

Figure 8:
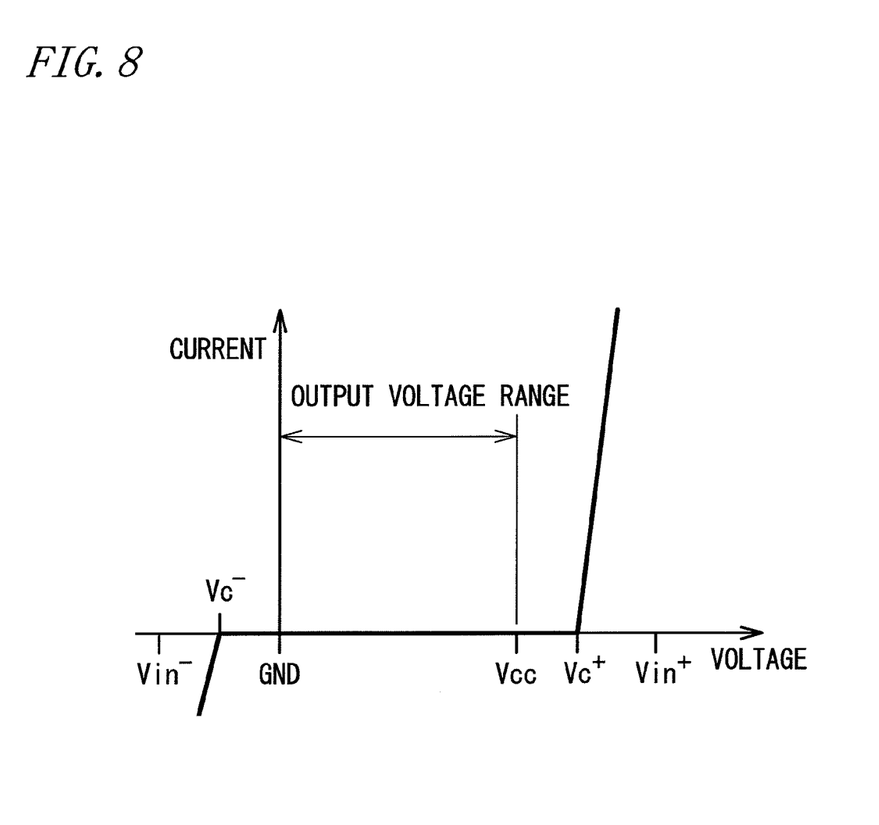
FIG. 8 is a graph showing the overview of the characteristic of the Zener diodes.

FIG. 8 is a graph showing the overview of the common characteristic of the Zener diodes D1 and D2. The output voltage sent to the transmission path 4 for signal transmission falls within the range of GND to the power supply voltage Vcc. For example, in the case where the plus voltage is applied to the cathode of the Zener diode D1 connected to the P1 side, current does not flow when the voltage is equal to or smaller than the clamping voltage $Vc^+$; whereas the current flows when the voltage is greater than the clamping voltage Vc⁺, and the cathode is maintained at the clamping voltage Vc⁺.

Conversely, in the case where the minus voltage is applied to the cathode of the Zener diode D1, current does not flow when the absolute value is equal to or smaller than the clamping voltage Vc⁻; whereas the current flows when the absolute value is greater than the clamping voltage Vc⁻, and the cathode is maintained at the clamping voltage Vc⁻. The same holds true for the Zener diode D2. It is to be noted that, there are selected the Zener diodes whose clamping voltages Vc⁺ and Vc⁻ are outside the output voltage range of GND to Vcc, such that no current flows through the Zener diodes D1 and D2 in the output voltage range of GND to Vcc.

On the other hand, the CMOS circuit structuring the analog switch S1 has a small voltage tolerance (approximately +0.3 V to Vcc, and −0.3 V to GND). Accordingly, a latch-up phenomenon may be incurred unless the CMOS circuit is used within that range. Defining that the current of the latch up withstand is $I_{LUP}$, and provided that this current flows through the analog switch S1, $I_{LUP}$ also flows through the discharging resistors R5 and R6 shown in FIG. 7, which invites voltage drop $I_{LUP} \times R$ where R is the resistance value of the discharging resistors R5 and R6. Accordingly, voltages Vin⁺ and Vin⁻ that can be input to P1 and P2 are as follows, respectively:

$$Vin^+ = Vcc + I_{LUP} \times R$$

$$Vin^- = GND - I_{LUP} \times R$$

Therefore, the CMOS circuit having the value of $I_{LUP}$ with which the above-stated Vin⁺ and Vin⁻ do not fall within the range of Vc⁻ to Vc⁺ as shown in FIG. 8 is selected. Thus, if the voltage that is greater than Vc⁺ occurs because of surge, then the voltage reduces to Vc⁺ by the operation of the Zener diode D1 or D2. Further, when the voltage that is greater than Vc⁻ in the minus direction occurs because of surge, the voltage is suppressed to Vc⁻ by the operation of the Zener diode D1 or D2. Suppressing the voltage to fall within the range of Vc⁻ to Vc⁺, as has been described, by the voltage drop of the discharging resistors R5 and R6, the voltage applied to the analog switch S1 can be alleviated. Thus, by the Zener diodes D1 and D2, the analog switch S1 can be protected.

Second Embodiment

Figure 9:
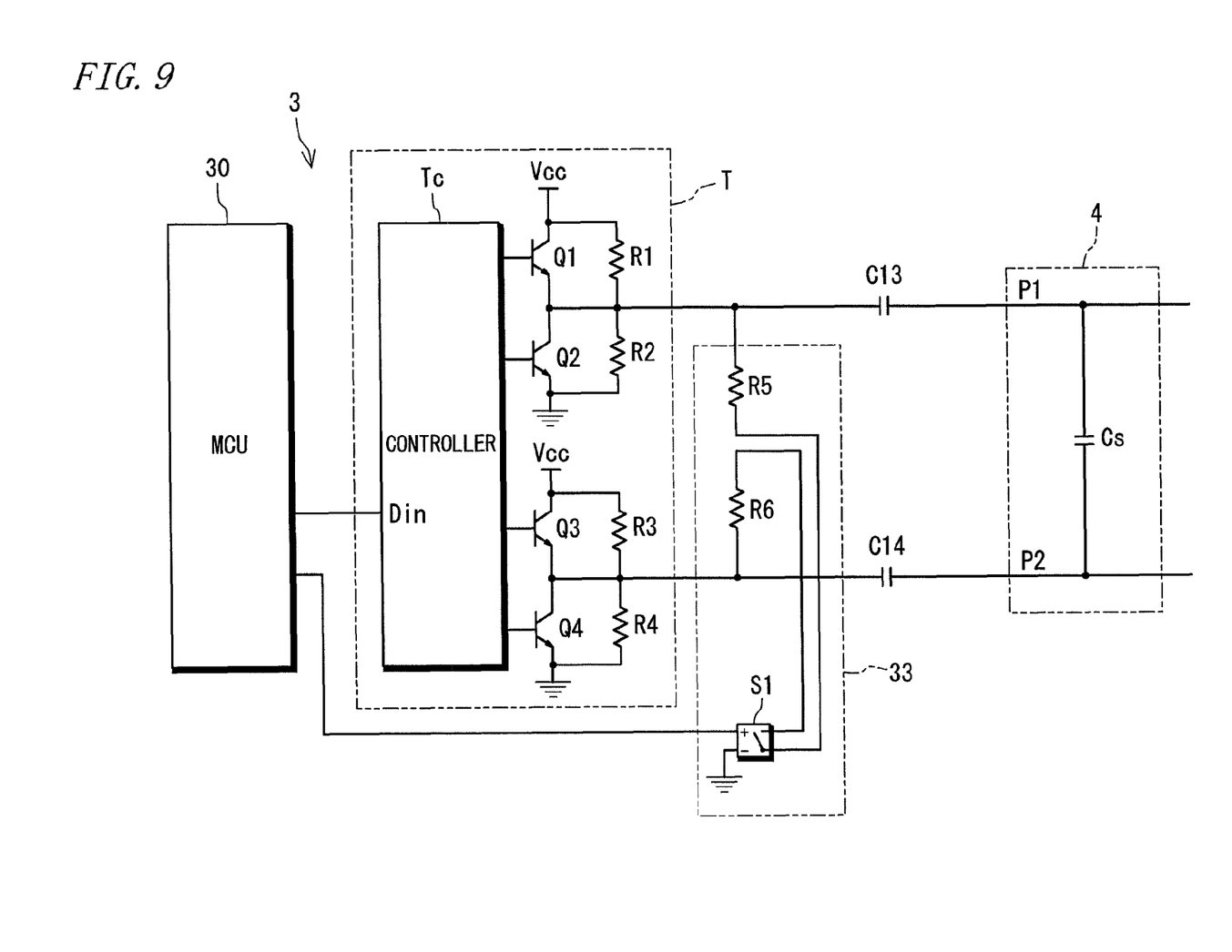
FIG. 9 is a diagram related to an air conditioner according to a second embodiment, being a circuit diagram showing the detail of a transmission unit and others in a remote controller, and a floating capacitance between two lines in a transmission path.

FIG. 9 is a diagram related to an air conditioner according to a second embodiment, being a circuit diagram showing the detail of the transmission unit T and others in the remote controller 3, and the floating capacitance Cs between two lines in the transmission path 4. The difference from FIG. 2 lies in that the control signal from the MCU 30 to the analog switch S1 is a signal that is different from the transmitted signal for instructing the controller Tc. The other structure remains the same.

Figure 10:
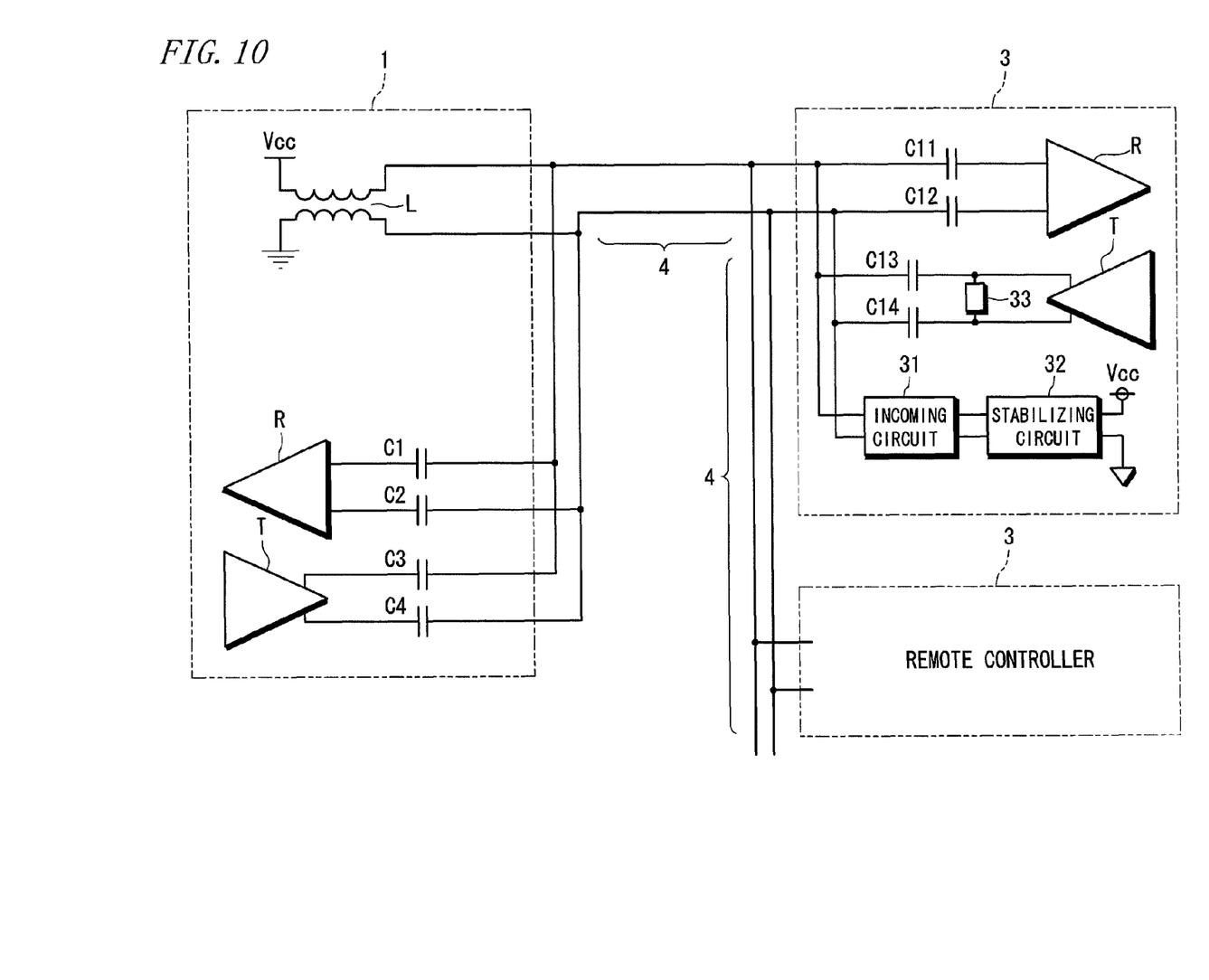
FIG. 10 is a circuit diagram showing the state where, in connection with signal transmission of the air conditioner according to the second embodiment, an indoor unit and a plurality of remote controllers are connected to each other through transmission paths.

Although the first embodiment is predicated that the indoor unit 1 and the remote controller 3 are in one-to-one relationship, in the second embodiment, as shown in FIG. 10, it is assumed that a plurality of remote controllers 3 are connected in parallel to one indoor unit 1. In this case, the discharging circuit 33 is provided to each of the remote controllers 3. In the state where a plurality of remote controllers 3 are connected in parallel, when the discharge control according to the first embodiment is executed, the remote controller that performs transmission disconnects the discharging resistors when causing a high level signal voltage between the two lines P1 and P2 of the transmission path 4 through signal transmission; whereas the other remote controller that does not perform transmission is connecting the discharging resistors between the two lines of the transmission path, because there is no instruction to disconnect the discharging resistor.

However, in this case also, by the remote controller performing transmission disconnecting the discharging resistor, the overall parallel resistance becomes greater as compared to the case where disconnection is not performed and, therefore, a certain power saving effect can be achieved. However, when the number of the remote controllers connected in parallel increases, disconnection of one of the discharging resistors can only provide relatively smaller effect to the overall parallel resistance, and hence the power saving effect weakens. Further, the impedance of the overall transmission path reduces. Therefore, the amplitude of a signal reduces with a long transmission path.

In consideration of the foregoing, in the second embodiment, in all the remote controllers 3 and the indoor unit 1 connected to the transmission path 4, their respective discharging resistors are basically previously disconnected. Then, only the device that performs transmission executes control as in the first embodiment as to whether to connect or disconnect the discharging resistors in accordance with the signal to be transmitted. That is, in FIG. 9, the control signal provided from the MCU 30 to the analog switch S1 is identical to the signal provided to the controller Tc when the remote controller 3 performs transmission; whereas the control signal is a signal that turns the analog switch S1 OFF when the remote controller 3 does not perform transmission. In this regard, the signal is different from the signal that is provided to the controller Tc.

Thus, as seen from the transmitting remote controller 3 or the indoor unit 1, the state equivalent to the state where no discharging resistors are present at the reception end is achieved. Accordingly, whichever device performs transmission, the power consumption by the discharging resistors can be prevented, and the attenuation of the signal can be suppressed. As a result, it becomes possible to achieve a further increase in the transmission path or an increase in the number of the remote controllers that can be connected.

Further, according to the second embodiment, even when a plurality of remote controllers 3 are connected to the transmission path 4, the discharging resistors in their respective remote controllers 3 are always disconnected except for the timing where their respective devices perform transmission. Accordingly, the load on the power supply does not increase.

Figure 11:
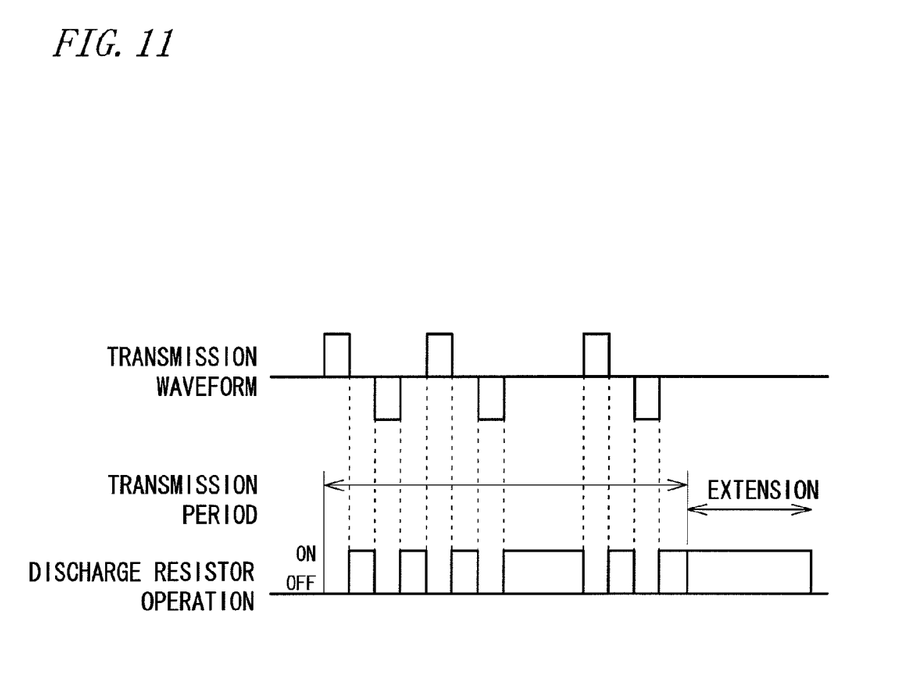
FIG. 11 is a diagram showing a transmission waveform and a discharging resistor operation.

It is to be noted that, the transmitting device may immediately disconnect its own discharging resistors at the end of the transmission period. However, it involves a disadvantage that noises tend to be superimposed when the impedance becomes high because of disconnection. Therefore, for example, as shown in FIG. 11, by causing the remote controller that performed transmission to extend the time during which the discharging resistors are connected for a prescribed time from the transmission period, the state where noises are not easily superimposed can be achieved. Further, the extension is terminated slightly before the next transmission period starts.

Others

It is to be noted that, in each of the embodiments described above, the description has chiefly been given of signal transmission between the indoor unit 1 and the remote controller 3. However, the discharge control as described above can be executed in other cases in which signal transmission is performed between devices of various combinations connected to each other through the transmission path. For example, the discharge control can be executed between the outdoor unit and the remote controller, or between a plurality of remote controllers. Further, in the case where the circuit that turns the discharging resistors ON and OFF and the discharge control function thereof are provided to each of the devices instead of the remote controller, similar discharge control can be executed between the outdoor unit and the indoor unit, between a plurality of outdoor units, and between a plurality of indoor units.

Further, although the transmission path in the embodiments described above involves two lines, the discharge control can similarly be executed between any two lines out of three or more lines.

Still further, although AMI scheme is employed as the coding scheme in the embodiments described above, similar discharge control can be executed as to transmission of digital signals according to other schemes.

REFERENCE SIGNS LIST

1: INDOOR UNIT
2: OUTDOOR UNIT
3: REMOTE CONTROLLER
4: TRANSMISSION PATH
30: MCU (CONTROL UNIT)
D1, D2: ZENER DIODE
P1, P2: LINES OF TRANSMISSION PATH (TWO LINES)
R5, R6: DISCHARGING RESISTORS
S1: ANALOG SWITCH (SWITCHING ELEMENT)

The invention claimed is:

1. An air conditioner having devices of an outdoor unit, an indoor unit, and a remote controller, the air conditioner performing signal transmission using a digital signal between the devices connected to each other through a transmission path including two lines, comprising:
   a discharging resistor for discharging a charge accumulated in a floating capacitance between the two lines;
   a switching element that performs an ON operation to make the discharging resistor connect between the two lines and an OFF operation to make the discharging resistor disconnect;
   a control unit that executes discharge control, during signal transmission in which one of a high level and a low level of an absolute value corresponding to a sign of the digital signal is set to a signal voltage between the two lines, to set the switching element to an OFF state when the setting is at the high level and to set the switching element to an ON state when the setting is at the low level.

2. The air conditioner according to claim 1, wherein
the discharging resistor includes a first discharging resistor having one end connected to one of the two lines and a second discharging resistor having one end connected to the other of the two lines, and
the switching element is a bidirectional element being interposed between the other end of the first discharging resistor and the other end of the second discharging resistor.

3. The air conditioner according to claim 2, wherein
cathodes of Zener diodes are respectively connected to the two lines, and
the switching element is structured with a CMOS circuit, a current value of latch up withstand of the CMOS circuit being selected such that a potential difference being applied in respective positive and negative directions to a power supply voltage Vcc and GND of the CMOS circuit becomes greater than clamping voltages $Vc^+$ and $Vc^-$ of the Zener diode in the respective positive and negative directions, the potential difference being attributed to the current value flowing through the discharging resistors.

4. The air conditioner according to claim 1, wherein
the control unit executes the discharge control by a digital signal to be transmitted.

5. The air conditioner according to claim 1, wherein
the discharging resistor, the switching element, and the control unit are provided in the remote controller.

6. The air conditioner according to claim 2, wherein
the discharging resistors, the switching element, and the control unit are provided in the remote controller.

7. The air conditioner according to claim 3, wherein
the discharging resistors, the switching element, and the control unit are provided in the remote controller.

8. The air conditioner according to claim 4, wherein
the discharging resistor, the switching element, and the control unit are provided in the remote controller.

* * * * *